Figure 1:
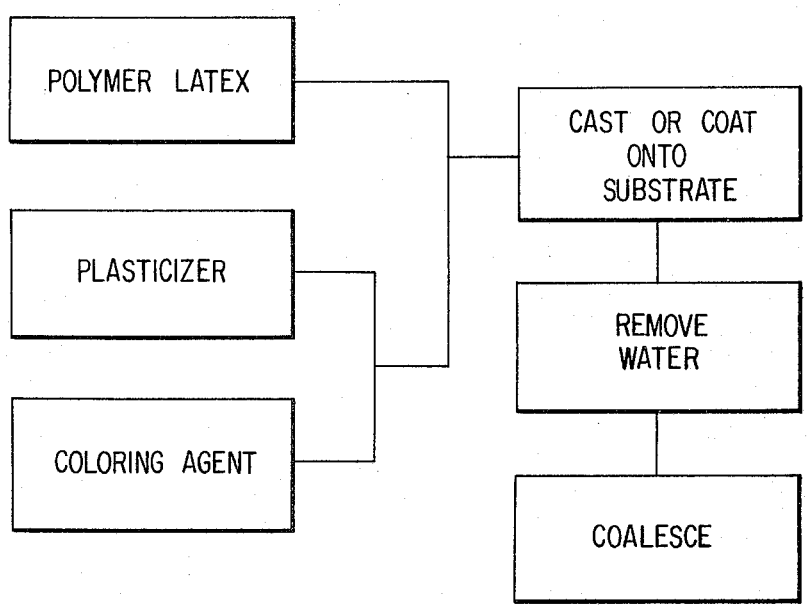

Feb. 7, 1967    P. CHEBINIAK ETAL    3,303,046
METHOD FOR MAKING LIQUID-FILLED POROUS PLASTICS AND PRODUCTS
Filed Dec. 30, 1963

INVENTORS.
PAUL CHEBINIAK
ROBERT T. WILEY

BY *Sughrue, Rothwell, Mion, and Zinn*

ATTORNEYS.

3,303,046
METHOD FOR MAKING LIQUID-FILLED POROUS PLASTICS AND PRODUCTS
Paul Chebiniak, Binghamton, and Robert T. Wiley, Vestal, N.Y., assignors to International Business Machines Corporation, New York, N.Y., a corporation of New York
Filed Dec. 30, 1963, Ser. No. 334,329
7 Claims. (Cl. 117—36.1)

The present invention relates to a method for producing porous plastic materials having contained in the pores a liquid which is expressible in response to pressure. In one important embodiment, the invention is directed to the production of ink-filled, porous plastic materials useful as transfer elements.

Conventional transfer materials in widespread use include the well-known carbon papers which generally comprise a tissue backing coated with a layer of carnauba wax containing a finely divided carbon black pigment. Other common transfer materials, such as typewriter ribbons, comprise absorbent fabric webs impregnated with a viscous vehicle containing various dyes, toners and pigments.

In more recent years, considerable effort has been directed to the development of substitutes for conventional carbon papers and typewriter ribbons which are intended to overcome various problems associated with them. Among the more important problems for which solution was sought were short useful life due to rapid depletion of the ink or pigment supply, smudging and set-off, failure to produce sharp or intense images, etc.

Some of the foregoing difficulties have been resolved to a limited extent by the development of new transfer materials comprising porous plastic films having a liquid or semi-liquid coloring material entrapped within their pores. Upon the application of pressure, the coloring material is expressed to form the desired image.

"Carbonless" transfer materials of this type are generally formed by mixing finely divided particles of plastic with a volatile solvent for the plastic and a less volatile, non-solvent organic liquid which contains dyes, pigments or toners. This mixture is then coated on a suitable substrate and is heated to evaporate the volatile solvent and to fuse the resin particles. The product is a porous, flexible film filled with the non-solvent organic liquid which is expressible in response to pressure.

Although the product produced in this manner is in many ways satisfactory, the method for producing it presents certain aspects which are not readily adaptable to commercial application.

First, from the standpoint of cost, the method requires finely divided resin particles as a starting material. Such particles are ordinarily produced by spray drying from an aqueous emulsion or suspension of the polymer. However, spray drying is an expensive operation requiring special equipment and adding to the length of the process.

Second, a feature of such methods is the evaporation of a volatile solvent from the mixture. This presents health and safety hazards and also a serious economic loss through evaporation of the solvent. Therefore, special precautions must be taken and apparatus provided to protect workers from the solvent vapors, to guard against explosion or fire, if the solvent is combustible, and to recover the solvent for further use in the process.

The above described technique has also been employed to produce self-supporting films by stripping the porous film from a temporary backing after it has dried and set. Such products find utility as typewriter ribbons, but their production is attended by the same disadvantages as outlined in the preceding paragraphs.

Other methods for producing porous, liquid-filled plastic materials involve the formation and manipulation of organosols or plastisols. Such systems ordinarily require as a starting material a finely divided resin particle which must be produced by spray drying. The spray drying step introduces an additional operation and expense into the method. In addition, the control of the organosol or plastisol to produce the desired result requires very precise handling and is a relatively demanding process.

Therefore, a primary object of the present invention is to provide an efficient, safe and economical method for producing liquid-filled, porous plastic materials.

Another important object of the present invention is to provide a new, economical and efficient method for producing ink-filled, porous, plastic transfer materials.

A further object of the present invention is to provide a method for producing ink-filled, porous, plastic transfer materials without the necessity of handling volatile solvents.

Another object of the present invention is to provide ink-filled, micro-porous, plastic transfer materials, such as "carbonless" carbon papers and typewriter ribbons, not requiring the use of finely divided, spray-dried resin particles as the starting materials.

The manner in which the above objects and many other highly desirable objects and advantages are achieved in accordance with this invention will be apparent from the following detailed description, considered in the light of the accompanying drawing.

Figure 2:
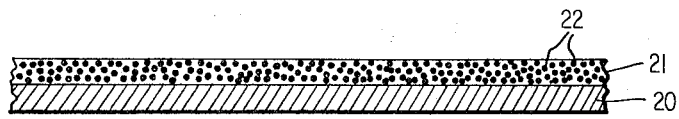
Figure 3:

In the drawing,
FIGURE 1 is a flow diagram of the method of the invention,
FIGURE 2 is a cross-sectional edge view of a product of the invention, and
FIGURE 3 is a cross-sectional edge view of a product of the invention.

In general, the present invention comprises mixing an aqueous latex of a polymer with a plasticizer to form an aqueous composition containing dispersed droplets of the plasticizer, coating the resulting mixture onto a substrate and coalescing the polymer particles to form a continuous porous phase containing the plasticizer in the pores. Under the influence of pressure, the plasticizer is expressed from the pores of the product.

In the primary embodiment, an organic dye is dissolved in the plasticizer so that the product may be employed as a transfer element. It will be obvious, however, that active ingredients other than ink-forming dyes or toners, may be incorporated into the plasticizer to alter the character and use of the end product. For example medicines,, antiseptics, deodorants, perfumes, waxes, polishes and many other substances might be similarly incorporated in the products.

Referring to FIGURE 1 of the drawing, FIGURE 1 is a representation of a flow diagram of one embodiment of the method.

As will be seen, a plasticizer, or mixture of plasticizers, is first combined with an additive, such as a coloring agent. The coloring agent may be an organic dye which is soluble in the plasticizer. The resulting mixture, dispersion or solution may itself then be dispersed in an aqueous medium and is then thoroughly mixed with an aqueous polymer latex. Alternatively, the plasticizer and additive may be pre-mixed and added without first being dispersed in water or they may be separately added to the latex without pre-mixing.

The resulting aqueous composition formed in any of the above modes is then coated onto a suitable substrate which may form a temporary or permanent support for the product.

The water is then removed from the composition, generally by evaporation assisted by heating, but adsorption into the substrate may also be used to remove water.

Finally, the polymer is coalesced to form a continuous porous matrix containing droplets of the plasticizer and additive in its pores. In response to pressure, the liquid plasticizer is exuded from the pores.

Some polymers will coalesce after removal of the water by curing at room temperature for a few minutes or hours. Others requiring heating at elevated temperatures for short periods of time to form cured, flexible, continuous plastic films.

As will be seen in FIGURES 2 and 3, the products of the invention may comprise elements which include a permanent support 20 on which the porous plastic matrix 21 and encapsulated liquid are carried. Or, the porous plastic product 30 may be stripped from a temporary support to provide an unsupported element as shown in FIGURE 3.

Where the liquid plasticizer inclusions 22 are dyed or colored, the products have particular utility as transfer media, such as typewriter ribbons, carbon papers and the like.

Any dye, toner or pigment that is used as an additive should be sufficiently compatible with the plasticizer so that it forms an ink or marking material with the droplets of the plasticizer which are entrapped in the porous plastic elements.

The aqueous latex of the polymer is preferably the product of the emulsion or suspension polymerization of the corresponding monomer.

The latices useful in this invention may be film formers or non-film formers at room temperatures, about 20°–25° C., and they may be anionic or non-ionic. Although such latices are usually obtained in solids concentrations of from 10% to 60%, the solids concentration of the starting latex is not critical. It will be clear, however, that the more water is present in the latice, the more will have to be removed from the coating.

Those polymers which do not form good films or films with sufficient flexibility when deposited from an aqueous latex may require fusion or the addition of a primary plasticizer to produce satisfactory films.

Typical aqueous latices or dispersions useful in the present invention are as follows: polyethylene, polyvinyl acetate, acrylates, polystyrene, polyvinyl chloride/acetate copolymers, styrene/acrylic copolymers, butyl rubber, styrene/butadiene, vinyltoluene/butadiene, butadiene acrylonitrile, polyvinyl pyrrolidone/vinyl acetate, vinyl pyrrolidone/ethyl acrylate, vinyl pyrrolidone/styrene, polyvinylidene chloride, polyvinylidene fluoride and polyamides such as nylon.

The plasticizer of the present invention are a well-known class of materials which are added to plastics to facilitate compounding and improve the flexibility and other properties of the finished products. The more familiar plasticizers now in commercial use are non-volatile organic liquids or low-melting solids, such as the phthalate, adipate and sebacate esters and aryl phosphate esters.

Plasticizers are often further categorized as primary or secondary plasticizers. While the line of distinction between the two types is not always sharp, a primary plasticizer is generally defined as one which solvates the plastic at elevated temperatures. Secondary plasticizers, however, have no substantial solvating effect on the plastic, even at elevated temperatures. Secondary plasticizers are frequently added to primary plasticizers as diluents.

Examples of primary plasticizers useful in the present invention include dibutyl phthalate, diethyl phthalate, dicyclohexyl phthalate, dimethyl phthalate, diphenyl phthalate, tributyl phosphate, tricresyl phosphate, diamyl phthalate, dibutyl sebacate, dicarbitol phthalate, tributoxyethyl phosphate, 2-pyrrolidone, dioctyl phthalate, dioctyl adipate, dioctyl sebacate, tricresyl phosphate, alkyl aryl phosphate, acetyltributyl citrate and propylene glycol.

Some materials useful as secondary plasticizers include mineral oil, castor oil, oleic acid and the like.

In the present invention, the plasticizer added to the polymer latex may be a primary plasticizer, a secondary plasticizer or a combination of primary and secondary plasticizers.

Where the polymer latex is capable of depositing a coherent film possessing sufficient flexibility, the addition of primary plasticizer is ordinarily not necessary. In this case, only secondary plasticizer may be added and this may serve as the vehicle or carrier for the active ingredient, such as a dye or toner. This is generally the case with films deposited from aqueous polyethylene emulsions.

In the case of polymer latices which do not deposit coherent films or produce only brittle films, it is preferable to add a combination of primary and secondary plasticizers. The primary plasticizer enables a coherent and flexible film to be deposited and the secondary plasticizer acts as a vehicle for the dye or other added ingredient.

The same result can also be obtained by adding an excess of a primary plasticizer to both improve the film and serve as the liquid vehicle. However, economy will ordinarily dictate the use of mixtures of primary and secondary plasticizers for this purpose.

As previously noted, a major embodiment of the invention is a method for producing transfer materials, in which case a coloring material is added to the composition. For this purpose, any dye or toner soluble in the plasticizer or any pigment capable of being dispersed in the plasticizer may be used. Examples of some suitable dyes include Flushed Alkali Blue, Oil Blue Black ZBC, Nubian Resin Black, etc.

It is believed that the invention will be more fully understood in the light of the following specific examples of the practice of the invention.

*Example 1*

About 75 parts by weight of an aqueous emulsion of polyethylene (Spencer EM 40), containing about 40% solids and about 6% of a non-ionic emulsifier, was thoroughly mixed with about 25 parts by weight of mineral oil containing about 40% of Flushed Alkali Blue as a coloring agent. The mixing was conducted until droplets of the mineral oil were thoroughly dispersed in the aqueous latex.

The resulting composition was then applied as a coating having a thickness of a few mils onto the surface of a Mylar substrate.

The water was then evaporated by heating and the resulting film was coalesced by fusion at 260° F. for from 10 to 60 seconds.

A continuous film adhered to the Mylar was produced in this manner and ink (mineral oil containing Flushed alkali Blue) was expressed from the film under pressure.

*Example 2*

Following the same procedure as Example 1, 75 parts by weight of the same aqueous polyethylene emulsion were thoroughly mixed with 25 parts by weight of castor oil containing a blue coloring agent.

The resulting aqueous composition was coated, dried and cured as in Example 1 and produced a product from which ink was exuted under impact.

*Example 3*

Following the same procedure as Example 1, 75 parts by weight of the same aqueous polyethylene emulsion were thoroughly mixed with 25 parts by weight of oleic acid containing a red coloring agent.

The resulting aqueous composition was coated, dried and cured as in Example 1 and produced a product from which ink was exuded under impact.

Example 4

About 50 parts by weight of the aqueous polyethylene emulsion of Example 1 were thoroughly mixed with 50 parts by weight of mineral oil containing 40% of Flushed Alkali Blue.

The procedure of Example 1 was then followed to obtain a product from which ink was expressed under impact.

Examples 1 to 4 inclusive illustrate methods using aqueous polymer systems which do not require primary plasticizer to form continuous, flexible films. Coalescing by curing at room temperature or by thermal treatment is sufficient. In this case, the liquid inclusions in the pores are droplets of a secondary plasticizer, such as mineral oil or oleic acid, in which a dye or other additive is included.

Example 5

About 60 parts by weight of an aqueous polyvinyl chloride latice (Geon-351), about 56% solids was thoroughly mixed with 20 parts by weight of dioctyl phthalate and 20 parts by weight of mineral oil containing 40% Flushed Alkali Blue as a coloring agent.

The resulting aqueous composition was coated as a thin film on a Mylar substrate. The film was then dried to evaporate the water and was cured at room temperature.

Example 6

Following the same procedure as Example 5, a dried film was produced on Mylar, but the cure was effected by heating at 280° F. for 5 seconds.

Example 7

Following the same procedure as Example 5, a dried film was produced on Mylar, but the cure was effected by heating at 280° F. for 10 seconds.

Example 8

Following the same procedure as Example 5, a dried film was produced on Mylar, but the cure was effected by heating at 280° F. for 15 seconds.

Example 9

Following the procedure of Example 5, a dried film was deposited on a non-woven fabric substrate (Weblon), and the cure was effected by heating at 300° F. for 10 seconds.

Examples 5 to 9 inclusive illustrate methods employing aqueous polymer latices which require the addition of a primary plasticizer to form continuous flexible films. In this instance, dioctyl phthalate was employed as the primary plasticizer and a secondary plasticizer, mineral oil, was also included to serve as the liquid vehicle filling the pores of the polyvinyl chloride matrix.

Example 10

About 70 parts by weight of an aqueous polyethylene emulsion, (Spencer EM 11), containing about 40% solids and about 5% of an anionic emulsifier, were thoroughly mixed with about 30 parts by weight of castor oil containing a green dye.

Following the procedure of Example 1, a thin film was deposited on a Mylar substrate, but the cure was effected by heating at 280° F. for 20 seconds.

Example 11

Example 10 was repeated using 85 parts by weight of the aqueous polyethylene emulsion and 15 parts by weight of dyed castor oil.

Example 12

Example 10 was repeated using 55 parts by weight of the aqueous polyethylene emulsion and 45 parts by weight of dyed castor oil.

The products of Examples 10, 11 and 12 all exuded ink satisfactory. As expected, more ink was exuded as the concentration of the castor oil containing the green dye was increased.

The above examples clearly show that the relative amounts of aqueous thermoplastic polymer latice, plasticizer and additive may vary over fairly wide ranges. In general, good results are obtained when the polymer to plasticizer weight ratio in the final product is on the order of 1:1. However, the polymer may range from about 40% to 90% by weight of the product, the balance being the plasticizer, depending on the specific materials employed and the properties desired in the final product.

While the present invention has been described in detail and has been illustrated by the disclosure of several specific and preferred embodiments, it will be apparent to those skilled in the art that many other changes or modifications may be made in the methods and products disclosed without departing from the spirit of the invention, as expressed in the scope of the following claims.

What is claimed is:

1. A method for making liquid-filled, porous plastic transfer sheets comprising:

mixing an aqueous thermoplastic polymer latex with a secondary plasticizer containing a coloring agent with which it is compatible to result in the coloring agent being entrapped to form an aqueous composition containing dispersed droplets of said secondary plasticizer and coloring agent, depositing a coating of said aqueous composition onto a substrate, removing the water from the coating of said aqueous composition, and coalescing the polymer to form a porous, plastic transfer sheet having said droplets of colored secondary plasticizer entrapped in the pores.

2. The method of claim 1 wherein the polymer is coalesced by heating to fusion.

3. The method of claim 1 wherein there is employed additionally a primary plasticizer.

4. The method of claim 1 wherein the aqueous thermoplastic polymer latex is an emulsion of polyethylene.

5. The method of claim 1 wherein the aqueous thermoplastic polymer latex is an emulsion of polyvinyl chloride.

6. The method of claim 1 wherein the coloring agent employed is an organic dye soluble in the secondary plasticizer.

7. The product of the process produced by the method of claim 1.

References Cited by the Examiner

UNITED STATES PATENTS

| | | | |
|---|---|---|---|
| 2,261,439 | 11/1941 | Kelly | 260—2.5 |
| 2,680,140 | 6/1954 | Carter | 260—2.5 |
| 2,800,077 | 7/1957 | Marron | 117—36.1 |
| 2,820,717 | 1/1958 | Newman et al. | 117—155 |
| 2,880,466 | 4/1959 | Gunderman et al. | 264—216 |
| 2,885,302 | 5/1959 | Phillpotts | 117—36.2 |
| 2,989,493 | 5/1961 | Clark | 117—36.1 |
| 3,055,297 | 9/1962 | Leeds | 117—36.1 |
| 3,079,351 | 2/1963 | Staneslow et al. | 117—36.1 |
| 3,117,018 | 1/1964 | Strauss | 117—36.1 |
| 3,159,592 | 12/1964 | McHugh et al. | 117—36.1 |

MURRAY KATZ, *Primary Examiner.*